AUTOMATIC COMPUTER ADJUSTMENT SYSTEM

Original Filed March 17, 1958 4 Sheets-Sheet 1

INVENTOR.
J.C.GIBSON-T.L.BOWERS
BY
[signature]
ATTORNEY

AUTOMATIC COMPUTER ADJUSTMENT SYSTEM

Original Filed March 17, 1958 4 Sheets-Sheet 2

AUTOMATIC COMPUTER ADJUSTMENT SYSTEM
Original Filed March 17, 1958 4 Sheets-Sheet 4
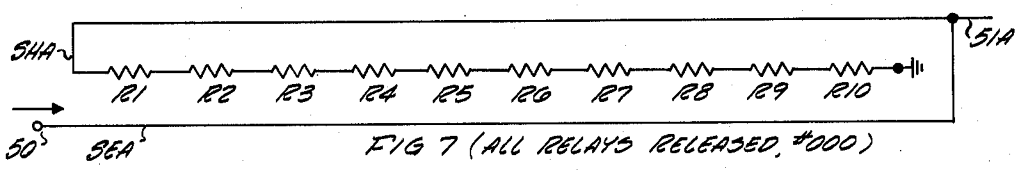
FIG 7 (ALL RELAYS RELEASED, #000)
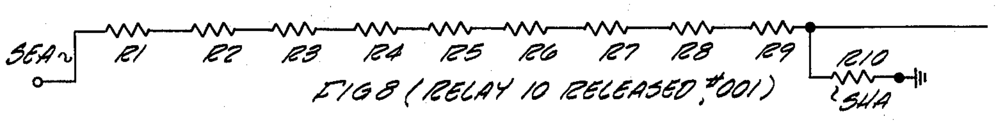
FIG 8 (RELAY 10 RELEASED, #001)
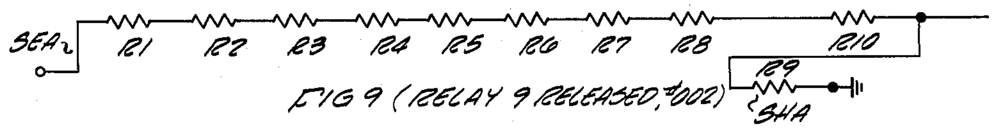
FIG 9 (RELAY 9 RELEASED, #002)
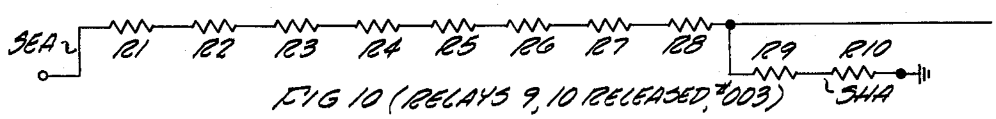
FIG 10 (RELAYS 9, 10 RELEASED, #003)
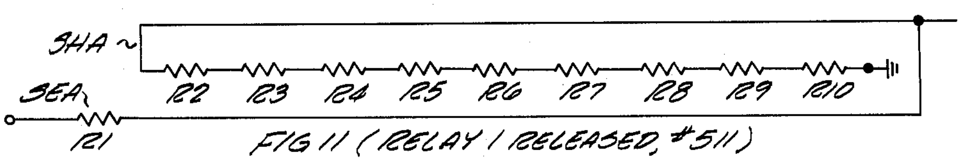
FIG 11 (RELAY 1 RELEASED, #511)
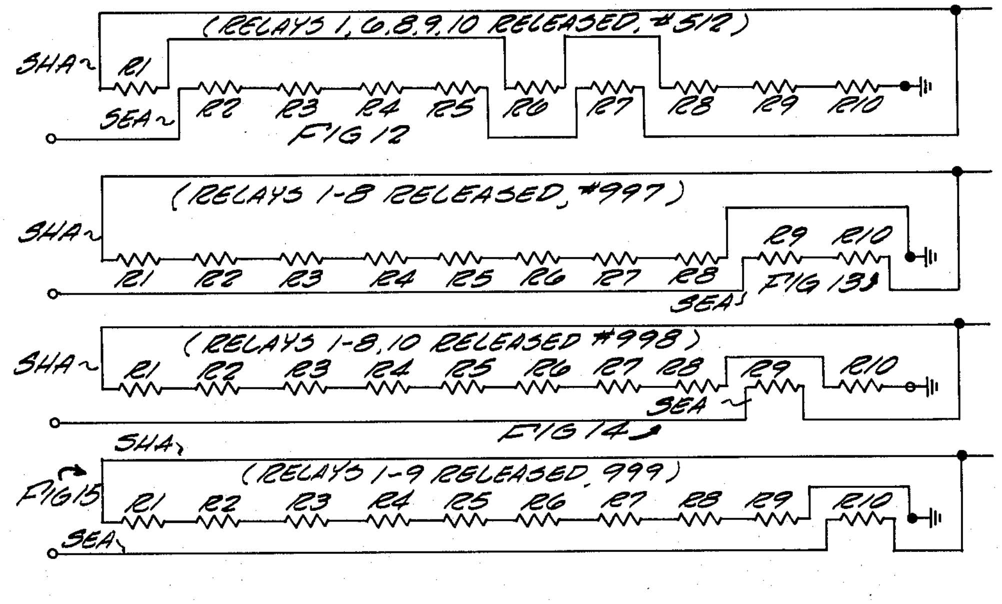
FIG 12, FIG 13, FIG 14, FIG 15

United States Patent Office 3,243,691

Patented Mar. 29, 1966

3,243,691

AUTOMATIC COMPUTER ADJUSTMENT SYSTEM

John C. Gibson, Oak Lawn, and Theron L. Bowers, Western Springs, Ill., assignors to International Telephone and Telegraph Corporation, a corporation of Maryland

Division of application Ser. No. 721,786, Mar. 17, 1958, now Patent No. 3,110,885, dated Nov. 12, 1963. Continuation of application Ser. No. 7,034, Feb. 5, 1960. This application Jan. 21, 1963, Ser. No. 252,743
4 Claims. (Cl. 323—80)

This invention relates to arrangements for selecting and adjusting elements used in analogue computers and more particularly relates to arrangements for minimizing such adjustment elements.

This application is a division of United States patent application, Serial No. 721,786, entitled Combined Switching and Adjusting System, filed by Gibson and Bowers on March 17, 1958, now Patent No. 3,110,885. It is also a continuation of U.S. application Serial No. 7,034, filed February 5, 1960 and now abandoned.

In the aforementioned parent application Serial No. 721,786, an arrangement is shown wherein interconnections and adjustments required from time to time among channels and components of an analogue computer system are remotely controllable in accordance with a predetermined program, which can be changed as required. Specifically a code receiver receives digital information from any suitable storage medium, such as a tape reader or manual controller, for example. This information is routed either to a switch controller for controlling interconnections in the system or to an adjustment controller. The controller adjusts a series of analogue elements such as potentiometers, amplifiers, and input resistors used in the computer.

In making this adjustment, the controller must first select and adjust one of many hundreds of potentiometers. Then it must select and adjust another of the potentiometers. The cycle repeats until every one of the many hundreds of potentiometers has been set. Heretofore attempts have been made to automate these selection-adjustment steps; however, in general these attempts have failed, primarily because the resulting system has been too expensive.

One characteristic of computers of the type contemplated is that the adjustment components are very expensive and must have extremely close tolerances. Moreover, many thousands of such components are required. Thus, there is a strong economic need for reducing to a bare minimum the number of such components. However, in the past, this minimization of adjustment components has not been easy when the selecting and adjusting device must respond to the stored information. For example, the automatic switching systems have become too complex and have not been sufficiently flexible to meet all needs. Thus, the practice has been to forget this use of automatic computer controls and to rely instead on manual adjustments. But that manual operation has been very expensive in down time of the computer.

Accordingly, an object of the invention is to provide new and improved automatic computer adjustment systems.

Another object of the present invention is to provide analog computer elements requiring a minimum number of parts. Yet another object is to provide an arrangement for controlling the insertion of elements arranged in binary increments, when the element ratios to the total number of increments do not correspond to required decimal values.

It is a further object of this invention to provide an arrangement for adjusting one or more potentiometers arranged in binary increments for use in an analogue computer system from a remote position to provide a decimal output in any one of a plurality of equal increments.

It is another object of this invention to provide a potentiometer arranged for binary control by means of decimal digits.

A feature of this invention is an arrangement for translating decimal digits into a particular binary equivalent for control of the setting of a potentiometer.

Another feature of this invention is to arrange a potentiometer whereby it may be controlled responsive to a series of binary digits representing any one of a plurality of decimal inputs to provide an output corresponding to a decimal input having a total possible value which does not equal the total possible binary value.

Still another feature of this invention is the arrangement of the resistance values of a potentiometer so that the total resistance thereof is equal to a particular decimal value for a plurality of settings, while the ratio of the resistance value of one potentiometer leg to the total resistance is established by binary increments to provide a resistance ratio of equal decimal increments for responsive settings.

In accordance with one aspect of this invention, a potentiometer includes a unitary series of impedance elements, such as resistors. Each element has an impedance value matching a corresponding one in a series of binary increments, as for example: 1, 2, 4, 8, 16, 32, 64, etc. Associated with the series of elements is a switching array for selectively transferring said elements to either one or the other arms of the potentiometer. This way each impedance element may serve a dual function with regard to the two potentiometer arms.

The above-mentioned and other features and objects of this invention and the manner of attaining them will become more apparent, and the invention itself will be best understood by reference to the following description of an embodiment of the invention taken in conjunction with the accompanying drawing, wherein.

Figure 1:
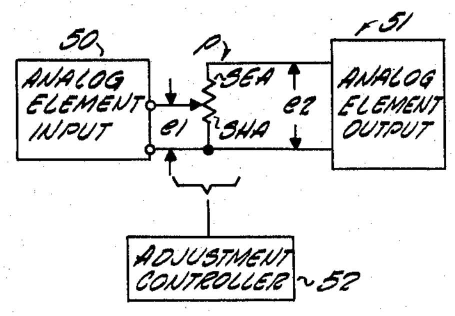
FIG. 1 is a block diagram showing how the invention is used in one exemplary analog computer.

FIGS. 7–15 give exemplary potentiometer settings to illustrate how the number of automatic potentiometer resistors are minimized through the application of binary code relationships to physical component values.

GENERAL DESCRIPTION

While the invention may find many uses, it is thought that a general description of one exemplary use might help give a more complete understanding of the principles involved. However, it should be understood that the invention is not limited to a use associated with this particular example. Quite the contrary, the invention may be used whenever automatic component insertion, of the described type, is desired with a minimized number of components.

According to this particular example, an analog computer (FIG. 1) mathematically analyzes test data associated with the design of an airplane. The test data is inserted into the computer at an analog element input 50 and taken from an analog element at output 51. While in the computer, each bit of test data must be multiplied by some ratio to give a correct output signal. This multiplication is here accomplished by the setting of a potentiometer P. For example, suppose that one bit of the test data at input 50 causes a voltage $e_1$ to appear at a given instant. At that same instant, the output voltage is a value $e_2$ because the potentiometer P multiplies by one value, at the setting shown in the drawing. Next, suppose that on a later problem the input voltage $e_1$ must be multiplied by a higher value; perhaps the voltage $e_1$ must be multiplied to become $3e_2$—it is only necessary to "slide" the potentiometer P to a new setting. And so it goes, on each problem the potentiometer slide must be positioned to the desired multiplication factor. This one potentiometer symbolically represents many (say five hundred) potentiometers, each of which must be set for every problem.

Figure 2:
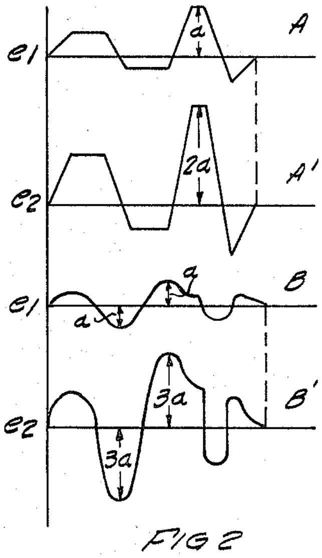
FIG. 2 shows arbitrarily drawn wave-forms representing (1) data which could have been derived by experimentation and (2) how the data may be multiplied in the computer.

To further illustrate the problem, suppose that wind tunnel testing has produced the waveforms of FIGS. 2 (A and B) which we shall describe as the stress upon a wing tip at sub-sonic and supersonic speeds respectively. (Actually these particular waveforms are purely arbitrary artists' conceptions.) Next, assume that stresses occurring at sub-sonic speeds must be multiplied by a mathematical value represented in the computer by a resistance of 5500 ohms in one side of the potentiometer. This produces an output value as shown in waveform A'. In like manner, the supersonic stresses of waveform B must be multiplied by another value to produce the waveform B'. Heretofore, the procedures would have been for a methamatician to analyze each of the waveforms A and B to produce pages of tables and other data. Next, an electronics engineer would prepare logic drawings for adjusting and wiring the computer to perform each mathematical step indicated by the mathematician. Finally, technicians actually adjusted and wired the computer to provide circuitry constructed in accordance with the logic diagrams.

In a complex problem, the technician's work could require four weeks, for example, and the actual computation could require an additional two weeks. This means that the computer cannot be assigned to any other problem for a period of six weeks; although, only two weeks are actually required for the computer to perform the necessary analysis. In view of the expense of a computer this is most uneconomical.

To avoid this useless shutdown of a computer while the technicians make a multitude of adjustments, it is only necessary to provide a medium, such as perforated tape, adapted to store and then read-out the mathematicians work into the computer. The signals read off the tape then operate an adjustment controller 52 which sets the computer. This way the potentiometer P is changed automatically to accommodate every bit of data read-out of storage. Now, however, the problem becomes one of economy. Resistors of the quality required for computers are most expensive. Thus, a minimization of the required number of resistors becomes a most important aim.

Our invention (FIG. 3) provides the functions of the adjustment controller 52, minimizes the number of resistors required to form the potentiometer P, and automatically selects the necessary one of five hundred potentiometers. This is accomplished by a unique adjustment system for selectively inserting resistors having values corresponding to binary increments into either of two potentiometer arms responsive to the receipt of binary coded information from a perforated tape reader 54. The major parts of this adjustment controller are a binary reader 55, a translator-controller 56, and a number of automatic potentiometers 57. The binary reader 55 includes a tape reader 54 and its associated binary code receiver 58. The translator-controller 56 comprises an adjust control circuit 59, and a translator 60. The translator 60 includes a number matrix device 61 made up of horizontal and vertical multiples selectively and arbitrarily joined together by easily removable diodes. In one exemplary form, this matrix may be a commercial product of ITT Kellogg, a division of the International Telephone and Telegraph Corporation.

Briefly, the matrix 61 is a coordinate array of intersecting horizontal and vertical buses embedded in a plastic material. The vertical buses are matrix inputs and the horizontal buses are matrix outputs. At each intersection or crosspoint, the plastic is formed into a window which exposes the buses. In this way, dry disk rectifiers, of any suitable design, may be selectively slipped into or removed from a window. When a rectifier is in place in any window, it interconnects the buses which intersect at that crosspoint or window. Thus, any code may be selected by the simple expedient of selecting the windows into which the rectifiers are placed. For example, the drawing shows a vertical bus VI with a dry disk rectifier TR1 in place at the intersection of horizontal bus H1, but no rectifier at the intersections of buses H2, H3. This means that the binary number "100" is stored in vertical V1. Other verticals have other stored numbers.

Figure 5:
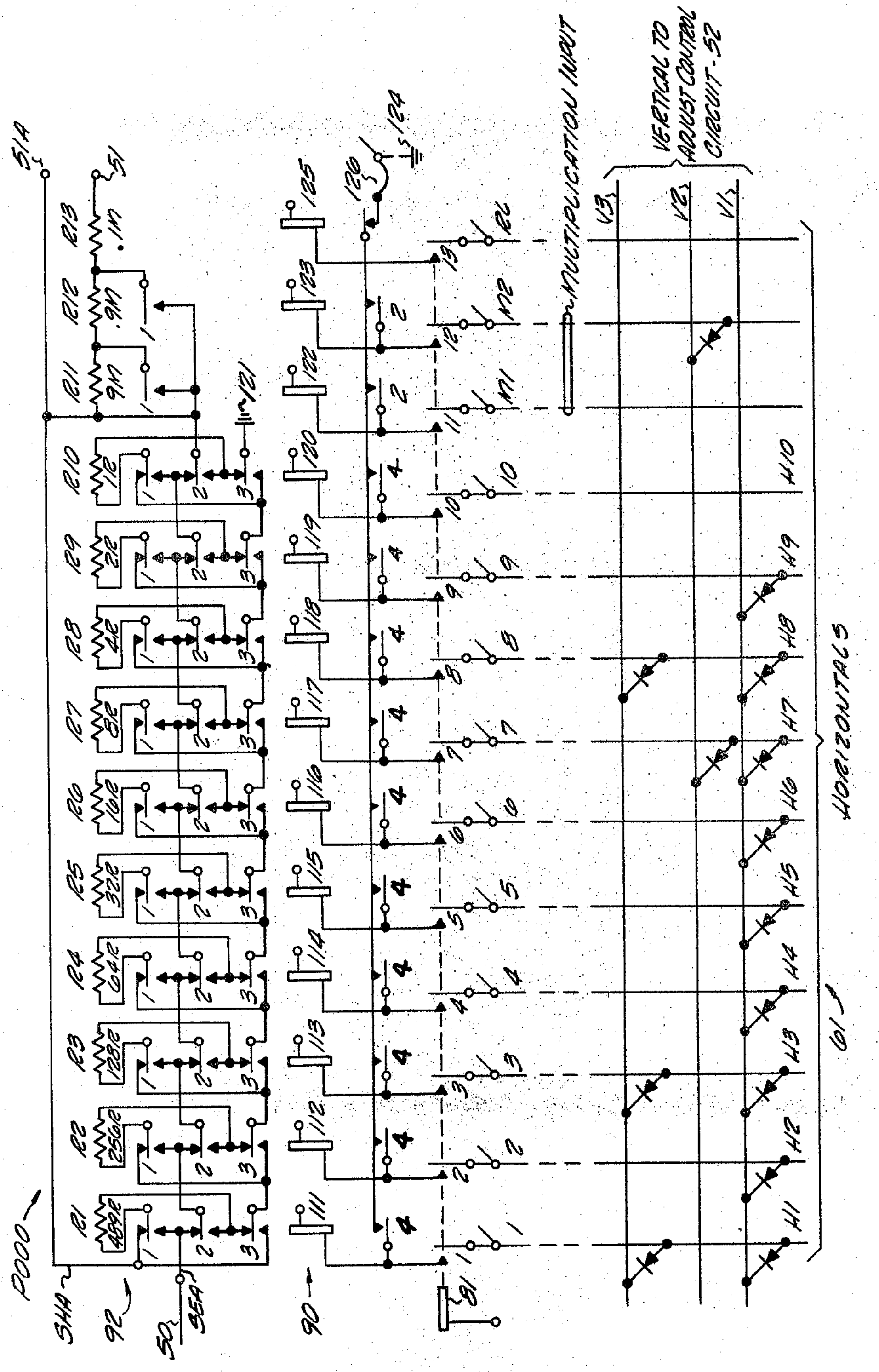
FIG. 5 shows a first embodiment of an automatic potentiometer.
Figure 6:
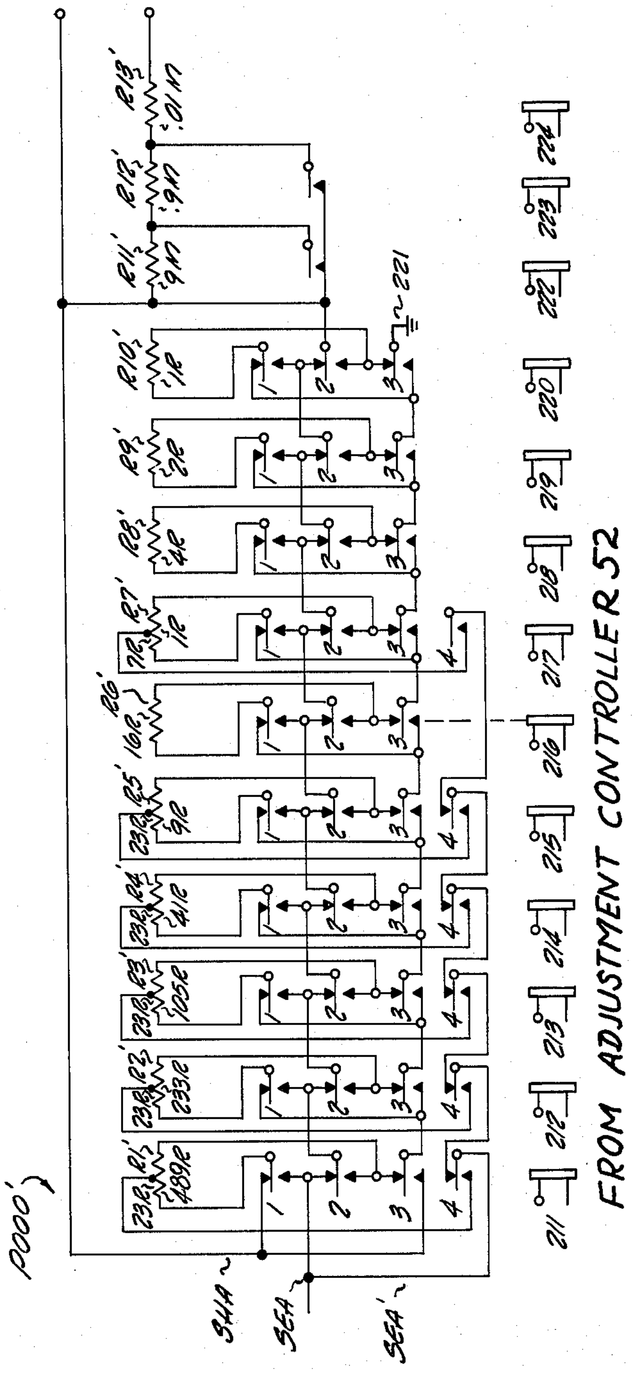
FIG. 6 shows a second embodiment of an automatic potentiometer.

The drawing shows an exemplary five hundred potentiometers by the designations P000, P001, . . . P499. Each potentiometer is constructed as generally shown in FIGS. 5, 6; although different circuit values may be provided, as required. As will become more apparent, the particular one of the five hundred potentiometers that is effectively set at any given time depends upon which one of many gate relays 62 is then operated. The number of gate relays required in any system may be reduced by operating them in coded combination.

Figure 4:
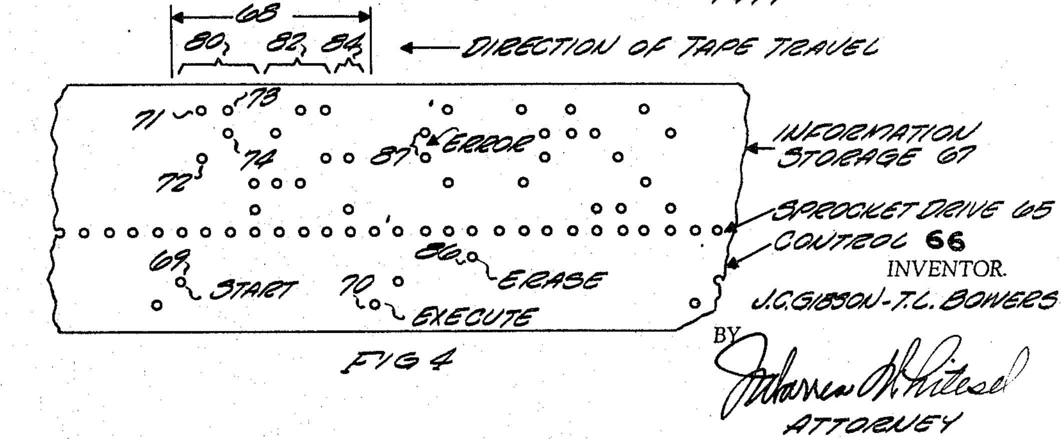
FIG. 4 is a fragmentary section of perforated tape used to control the adjustment system of FIG. 3.

The circuit operates this way. Information is punched into a conventional perforated tape, an exemplary fragment of which is shown in FIG. 4. The tape includes a series of sprocket drive holes 65, a control side 66 and an information storage side 67.

A block of information 68 begins with a hole in a start 69 position and ends with a hole in an execute 70 position on the control side 66 of the tape. Between these two block designating holes, seven bits of information are punched in a 2-out-of-5 code. As one step in the computer operation, all seven bits of information are read off the tape by the tape reader 54 and stored in associated individual binary code receiving registers R1–R7 of circuit 58. For example, binary code signals 71, 72 are stored in register R1, binary code signals 73, 74 are stored in register R2. In a similar manner, all seven bits of binary code information 68 are read off the tape and stored in the binary code receive circuit 58.

After storage of this binary information, signals are transferred to digital registers DR1–DR7 in the adjust control circuit 59. Responsive thereto the automatic potentiometer is adjusted. In greater detail, the first three bits of information 80 punched into the tap (FIG. 4) identify the required automatic potentiometer P000. As soon as this information reaches the adjust control circuit 59, a gating relay 81 operates (assuming that it is selected by the information 80). Obviously other information in position 80 would operate another corresponding gating relay in group 62 to select some other automatic potentiometer.

The next three bits of information 82 are directed into the translator circuit 60. There, a number of detector fields, such as 61, are arbitrarily arranged to translate the information stored in digital registers DR1–DR7 into any convenient and usable form. For example, as pointed out above, the diode TR1 is here shown as arbitrarily providing the binary output "100." Of course, any verticals may be connected to any horizontals by making similar diode connections. Then, the arbitrarily translated signal feeds out of the translator 60 and over conductor 83 to the automatic potentiometer associated with operated contacts on the selected gate relay.

Finally, the last bit of information 84 (FIG. 4) selects a multiplication factor. Thus, the automatic potentiometer is operated by information 84 to multiply the potentiometer output by 100, 1000, 10000, etc.

After the potentiometer is set, the circuit commands transmission of the analog output voltage 50 at the indicated multiplication. Then, the entire block of data is cancelled from storage in the adjustment controller 52 and the next block of information is read off the perforated tape and into storage.

In addition to the foregoing operations, the circuitry may perform other miscellaneous control functions, as required. For example, one such control is indicated in FIG. 4 as erase 86. It may be assumed here that some holes (error 87) were incorrectly punched. So the erase hole 86 commands the binary code receive circuit 58 to release all information stored responsive to the ERROR signal. Then, the correct information is read off the tape and into storage.

DETAILED DESCRIPTION

With the foregoing description of the system logic in mind, it is thought that the invention will be better understood from the following explanation of the details of two exemplary automatic potentiometers, as shown in FIGS. 5 and 6.

In keeping with one aspect of this invention, the number of automatic potentiometer resistors 92 is minimized. For a better understanding of this feature of the invention, let us reconsider the showing of FIG. 1. There the potentiometer P is shown as a simple device comprising a single resistor and a sliding contactor. A device of this type would, of course, function very well; however, it would be enormously expensive to construct and operate. The computer would be useless unless an extreme precision of setting is maintained. This would likely require a numerically controlled machine with feed back servo mechanisms. Even then, there would be critical points of potential system failure which could not be tolerated. For example, a mistake in the computation of airplane wing stresses, in the exemplary computer, could cause civilian disaster with a loss of life. Or it could cause a failure of a nuclear bomb carrying vehicle and conceivably the loss of a civilization.

To avoid expense, and yet provide the required reliability, one might turn to a stepping switch having incremental resistors wired to successive bank terminals. Thus, the switch could be stepped to a definite, numerically fixed position and provide a functional equivalent to the sliding device of FIG. 1. However, the proposed stepping switch is also very expensive. For example, suppose that the total potentiometer resistance is 100,000 ohms, and further that the computer requires changes in 100 ohm increments. If either a single stepping device or chain of relays is used, 100,000 ohms adjustable in 100-ohm increments would require 1000 resistors. In actual practice a coded combination of several stepping switches or chains of relays might be used, but the result would be the same—too many resistors would be required. Considering the expense of individual resistors of the type and quality required for five hundred or more potentiometers, this is also a very expensive device.

Through the use of our invention, the number of resistors may be reduced to a minimum, below which further reduction is theoretically impossible. We do this by inserting or removing selected resistors in either potentiometer arm in what might, for convenience of expression, be termed a binary coded combination.

Next, reference is made to FIG. 5. It shows the matrix 61, the poteniometer P000, gate relay 81, and control relays 90. The potentiometer P000 is made up of a unitary series of impedance devices, such as resistors 92, each having a different impedance value. By inspection of the exemplary impedance values given in the drawing, it will be apparent that each resistor corresponds to one in a series of binary increments, i.e., 1, 2, 4, 8, 16, 32, 64, etc. No two resistors have the same value.

Figure 3:
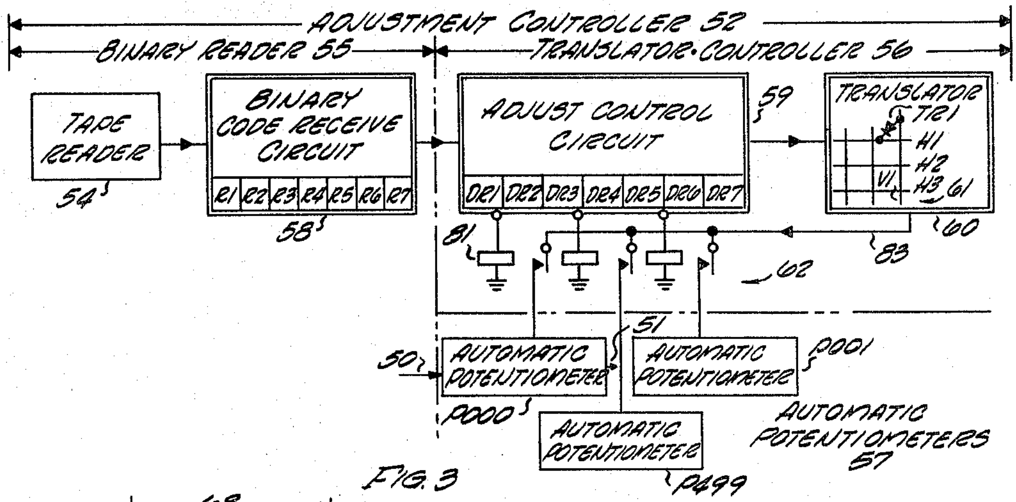
FIG. 3 is a block diagram illustrating the construction of an exemplary adjustment system embodying the principles of the invention and used in the computer of FIG. 1.

The information read out by the tape reader is processed in circuits 58, 59 of FIG. 3 and applied in either sequence or coded combination to the verticals of FIG. 5. Then, any suitable rectifier coding causes the relays 90 to operate in a desired combination. The operated relays transfer selected resistors into one arm of the potentiometer and the unoperated relays leave the remaining resistors in the other arm of the potentiometer.

*FIG. 5.—First embodiment of the invention*

In greater detail, as shown in FIG. 5, potentiometer P000 comprises resistors R1 to R10 and respectively associated relays 111–120. Each of these relays has a contact set numbered 1 to 3 for variously interconnecting these resistors, in series, between the analog element input 50 and the analog element output 51. The common connection is shown as ground 121. Associated with potentiometer P000 is an adjustable resistor for providing a multiplication factor. This multiplication resistor comprises the resistor sections R12 to R13, interposed between the potentiometer output conductors 51A and 51. Multiplier resistors R11 and R12 are arranged to be shunted by relays 122 and 123 as described in the parent application.

Any operated relay 111 to 120, 122, 123 is arranged to lock operated to ground 124 through contacts of relay 125 and jumper 126. Release relay 125 is provided for unlocking and restoring the other relays as a routine preliminary procedure before any new potentiometer adjustment.

With all relays 111 to 120 restored, input conductor 50 is connected over the indicated series arm SEA through back contacts 2 of relays 111 to 120, to output conductor 51A without any of the resistors R1 to R10 therein. At the same time, the indicated shunt arm SHA of the potentiometer between output conductor 51A and ground 121 includes all of the resistors R1 to R10 in series. Each resistor is connected in arm SHA through back contacts 1 and 3 of the relays 111 to 120. Also, with all relays restored, the three multiplication sections R11, R12, and R13 are connected between conductors 51A–51 to provide a total of 10 megohms.

Conductor 51A may be extended as the output conductor when the multiplication resistors R11 to R13 are not used. Conductor 51 may be extended as the output conductor if the multiplication resistors are used.

When the adjustment of potentiometer P000 is to be changed gate conductor 83 is energized by the adjustment controller 52. Gate relay 81 operates to select potentiometer P000. Also, common release conductor RL is energized; relay 125 operates to restore any operated relay 111–120, 122, 123. Following this any desired ones of the common conductors 1 to 10 are energized through the matrix 61, along with both, either or neither of the multiplication conductors M1 and M2. A moment later, release conductor RL is de-energized; relay 125 restores, thereby locking operated any operated ones of the relays 111–120, 122, 123. Shortly thereafter gate relay 81 restores, to again isolate potentiometer P000 from common conductors 1–10, M1, M2 and RL.

*Adjustment pattern of potentiometer*

FIGS. 7–15 illustrate the pattern of potentiometer adjustments imparted to the apparatus of FIG. 5 with various combinations of the relays 111 to 120 operated as a result of the receipt of various code number from tape reader 54. These numbers are represented by the fourth, fifth, and sixth digits (82, FIG. 4) of a seven digit number. The parenthetitcal notes in FIGS. 7–15 refer to the relays 111 to 120, respectively, as relays 1–10, thus corresponding to the associated resistors R1–R10. The numbers (e.g. #000,002 . . . 999) indicate the three-digit decimal number received by the adjust control circuit 59 to effect the illustrated adjustment. It should be understood, of course, that any of the ten relays are in operated condition unless indicated as restored.

*FIG. 7.—Setting 000*

In the all-relays-restored condition indicated in FIG. 7, the total series resistance of resistors R1 to R10 is in the shunt arm SHA. The series arm SEA contains none of these resistors. Thus, input conductor 50 is connected directly to output condenser 51A, and both conductors are grounded at 121 through the total series resistance of resistors R1 to R10. As described for FIG. 5 series arm SEA now includes the serially related back contacts 2 of relays 111–120. The shunt arm SHA includes, in series with each of the resistors R1 to R10, back contacts 1 and 3 of its associated relay. This all-relays-restored condition occurs responsive to the perforated tape information 82 "000".

According to our invention, the decimal adjustment numbers 001 to 999, may be treated as decimal fractions .001 to .999, with the number 000 being treated as 1,000. Decimal setting number 000 may thus be read as 1000, and it indicates that 1000/1000 (all) of the input potential is delivered to the output conductor. The binary number into which the unity-ratio decimal number 000 is translated may be written as 0,000,000,000. This specific decimal-to-binary translation is effected in the matrix 61 by a connection of no rectifier tie points between a vertical and any of the associated horizontals H1 to H10.

*FIG. 8.—Setting 001*

FIG. 8 indicates the potentiometer setting for the decimal number 001. Thus number 001 indicates that 1/1000th of the input potential is to be in applied to output conductor 51A. Translation of decimal number 001 to binary number 1,111,111,110 is obtained by supplying a matrix vertical V1 with translating rectifiers TR1–TR9 for each of the horizontals H1 to H9, but none at H10. Thus, each time that vertical V1 is operated the first nine relays 111–119 operate.

In FIG. 8, with only the tenth relay 120 restored, the resistors R1 to R9 are connected in series between input and output conductors 50, 51A. Output conductor 51A is connected to ground 121 via resistor R10. The resistor R10 resistance value "IR" (which is any desired adjustment resistance increment), may be 100 ohms, for example. If the potentiometer is to be adjusted in 25 ohm steps, "IR" would equal 25 ohms, or, any other value could be used. Thus, the resistance of shunt arm SHA is $\frac{1}{1000}$th of the total resistance of all of the resistors R1–R10 connected in series.

It may be well to note again that nine of the resistors (R2–R10) in the potentiometer have ohmic values which correspond to the power of "2" from $2^0$ to $2^8$, the binary increments. This facilitates transfer of resistors from either one or the other potentiometer arms in a binary code. However, the tenth resistor R1 does not correspond to the value of $2^9$. This is because we wish to reach the decimal value of 1000. If we used the binary value 512 for resistor R1, we would pass 1000 and go to 1024 ohms. Therefore we use a lesser value which, when added to the other resistive values, equals 1000. More will be said about this feature later.

More precisely, the configuration of FIG. 8 relates to FIG. 5, as follows. The series arm SEA extends from input conductor 50 through resistors R1 to R9 in series by way of front contacts 1 and 2 of operated relays 111–119 to the lever arm of contact 2 of relay 119, and thence through back contact 2 of the restored relay 120, to conductor 51A. The shunt arm SHA extends from conductor 51A, through the serially related front contacts 3 of the operated relays 111–119, to lever contact 3 of operated relay 119, the thence, through resistor R10, by way of back contacts 1 and 3 of the restored relay 120 to ground. This .001 ($\frac{1}{1000}$th) setting of potentiometer P000 causes one thousandths of any signal voltage applied between conductor 50 and ground 121 to be applied between output conductor 51A and ground since the IR unit of resistance of resistor R10, now in the shunt arm SHA, is one thousandths of the 1000-unit total of resistors R1 to R10.

*FIG. 9.—Setting 002*

Referring now to FIG. 9, the potentiometer setting is 002 to provide .002 of the input potential. This setting is secured by the translation and transmission of potentiometer setting binary number 1,111,111,101 as a result of the translating rectifiers TR associated with an energized vertical. This time only relay 119 is restored; the remaining relays 111 to 118 and 120 are operated.

*FIG. 10.—Setting 003*

FIG. 10 illustrates the potentiometer setting responsive to the binary number 1,111,111,100. This corresponds to the decimal number 003, to insert in series with the output conductor 51A .003 of the total potentiometer potential of input conductor 50. For this purpose relays 119, 120 are restored to include resistors R9 and R10 in the shunt arm SHA, which now traverses front contacts 3 of the operated relays 111 to 118, and extends thence to ground 121 through resistors R9 and R10, by way of back contacts 1 and 3 of relays 119 and 120, giving three units of resistance in the shunt arm to supply .003 to the input potential to output conductor 51A.

Resistors R1 to R8 are now in the series arm SEA, which extends through front contacts 1 and 2 of relays 111 to 118, to lever contact 2 of relay 118, extending thence through back contacts 2 of relays 119 and 120 to conductor 51A.

*FIG. 11.—Setting 511*

From the foregoing, it is evident that the settings for each suceeding decimal number follow a progressive procedure until the setting according to the decimal number 511 occurs. Then, the first relay 111 is operated alone as shown in FIG. 11. With all other relays restored, the binary number is 100,000,000. There is thus provided a total shunt-arm resistance of 511 resistance units with .511 of the input potential being impressed on output conductor 51A.

*FIGS. 12–15.—Settings 512 to 599*

It will be observed that the adjustment of FIG. 11 for decimal number 511 and ratio .511 (all of the resistors except R1 are in the shunt arm, leaving resistor R1 alone in the series arm) is the highest ratio of output potential to input potential which can be obtained without employing the 489-unit resistor R1 in the shunt arm of the potentiometer. As a consequence, the potentiometer settings in response to all decimal numbers 512 to 999 include resistor R1 in the shunt arm, which is indicated for the typical settings illustrated in FIGS. 12–15.

The potentiometer-relay settings for decimal number 512 to 999, typical examples of which are shown in FIGS. 12 to 15 as noted, are special relay binary number settings in that they comprise a departure from the orderly decimal-to-binary translation of numbers 001 to 511. This translation departure is made because a ten-digit binary number provides for a total of more than the noted one thousand potentiometer settings, and exceeds the noted one thousand values of the three-digit decimal numbers 000 to 019. A ten-digit binary number may have any one of 1023 values, plus one additional value wherein the binary number consists of ten zeros, employed as herein noted to effect a unity ratio setting.

A logical strictly binary arrangement of the resistors R1 to R10 is one in which resistor R1 contains 512 units of resistance for a total resistance-unit value of 1023. Resistor R1, however, has deliberately been provided with only 489 units of resistance, rather than 512 to give a total of only 1000 units of resistance to coincide with the noted maximum number of values of a three-digit decimal number. The resulting translation departure causes no difficulty in the adjustment controller 52 (FIG. 1). The translator matrix 61 can include arbitrary diode connections to translate any three-digit decimal number into any desired ten-digit binary number. These translations have no necessary relationship to any of the other decimal-to-binary translations.

In the decimal-number 512 setting illustrated in FIG. 12, relay 1 is restored to place the 489 units of resistor R1 in shunt arm SHA. Relays 116 and 118 to 120 are restored. Thus, resistors R6, and R8 to R10 (totaling 23 units of resistance) are in the shunt arm SHA. The total (489+23) shunt-arm resistance value is now 512 units. The remaining 1000 resistance units (R2–R5 and R7) are now in the series arm SEA. The binary number for this FIG. 12 setting is 0,111,111,111, rather than binary number 0,111,101,111, logically assigned to the decimal number 512.

Aside from the translation departure exemplified by FIG. 12, the binary numbers and settings for decimal numbers higher than 512 follow an orderly pattern which terminates in the settings according to decimal numbers 997, 998 and 999 (binary numbers 0,000,000,011 to 0,000,000,010 and 0,000,000,001), as indicated in FIGS. 13–15.

In FIG. 13 for decimal number 997, relays 111 to 118 are restored. This places all resistors in the shunt arm except for resistors R9 and R10. Thus the total shunt-arm resistance is 997 resistance units. In FIG. 14 for decimal number 998, relays 111 to 118 and 120 are restored to place all resistors except resistor R9 in the shunt arm. Here the total shunt-arm resistance is 998 units. Finally, in FIG. 15 for decimal number 999, relays 111 to 119 are restored to place resistors R1 to R9 in the shunt arm for a total shunt-arm resistance of 999 units.

Following decimal number 999 (binary number 0,000,000,001) is the final decimal number 000 which completes the series of one thousand three-digit decimal numbers (binary number 0,000,000,000). This brings us back to the adjustment of FIG. 7.

*FIG. 6.—Second embodiment of the invention*

Potentiometer P000' of FIG. 6 is the potentiometer P000 of FIG. 5 modified to accept a logical unbroken series of 999 binary numbers representing decimal-to-binary translations of decimal-system numbers 001 to 999. Such a potentiometer is of special utility in an adjustment system employing a fixed translator which does not provide the arbitrary diode connections to matrix 61. For example, some binary counters may not be able to arbitrarily add "23" to each decimal number 512 to 999, as is effectively done by matrix 61 in the above described translator.

In FIG. 6, adjustment relays 211 to 223 correspond to relays 111 to 123 of FIG. 5. The gating relay 81 and the locking circuitry for relays 811 to 823 are omitted in view of their disclosure in FIG. 5. The resistors R1' to R13' of FIG. 6 correspond respectively to resistors R1 to R13 of FIG. 5 but with the resistance value modifications indicated on the drawing for the tapped resistors R1' to R5' and resistor R7' of FIG. 6. Resistor R1' of FIG. 6 is increased from a value of 489 resistance units to a value of 512 resistance units. This gives a total R1' to R10' resistance value of 1023 resistance units to accord with the decimal equivalent (1023) of binary number 0,000,000,001.

Resistor R1' of FIG. 6 is tapped to provide two sections of 23 units and 489 units respectively. The resistor R2' of 256 total resistance units, is tapped to provide two sections of 23 and 233 resistance units. Resistor R3' of 128 total resistance units is tapped to provide two sections of 23 and 105 resistance units. Resistor R4' of 64 resistance units total is tapped to provide two sections of 23 and 41 resistance units. Resistor R5' of 32 resistance units is tapped to provide two sections of 23 and 9 resistance units respectively. Finally, resistor R7' of 8 resistance units total is tapped to provide two sections of 7 and 1 resistance units.

Resistors R1 to R10, considered as untapped resistors, are controlled by contacts 1 to 3 of relays 211 to 220 as is done in FIG. 5 by relays 111 to 120. The arrangement in FIG. 6 is such that the one of the resistors R1' to R10' which is associated with an unoperated relay 211 to 220 is included in the shunt arm SHA and is excluded from the series arm SEA. The operation of any one of the relays 211 to 220 removes the associated one of the resistors R1' to R10' from the shunt arm and places that resistor in the series arm.

Relays 211 to 215 and 217 are each provided with additional contacts 4 which control connections to the tap points of the respective tapped ones of the resistors. For each true binary combination of the relays 211 to 220 which corresponds to any decimal number 001 to 999 (binary numbers 1,111,111,110 to 0,000,011,000) 23 resistance units is removed from the series arm SEA making the total effective series-arm and shunt-arm resistance a decimally related one thousand units, instead of the binary related 1023-unit total of all of the resistors R1' to R10'.

The following table applies specifically to FIG. 6 and illustrates the decimal to binary translation (or rather the result of such translation with respect to relay operation) of the selected and illustrative numbers from 001 to 999.

*Fig. 6.—Relay table*

| Decimal Nos. | Relays Operated | | | | | | | | | |
|---|---|---|---|---|---|---|---|---|---|---|
| | 211 | 212 | 213 | 214 | 215 | 216 | 217 | 218 | 219 | 220 |
| 001 | X | X | X | X | X | X | X | X | X | ---- |
| 002 | X | X | X | X | X | X | X | X | ---- | X |
| 003 | X | X | X | X | X | X | X | X | ---- | ---- |
| 511 | X | ---- | ---- | ---- | ---- | ---- | ---- | ---- | ---- | ---- |
| 512 | ---- | X | X | X | X | X | X | X | X | X |
| 767 | ---- | X | ---- | ---- | ---- | ---- | ---- | ---- | ---- | ---- |
| 768 | ---- | ---- | X | X | X | X | X | X | X | X |
| 895 | ---- | ---- | X | ---- | ---- | ---- | ---- | ---- | ---- | ---- |
| 896 | ---- | ---- | ---- | X | X | X | X | X | X | X |
| 959 | ---- | ---- | ---- | X | ---- | ---- | ---- | ---- | ---- | ---- |
| 960 | ---- | ---- | ---- | ---- | X | X | X | X | X | X |
| 991 | ---- | ---- | ---- | ---- | X | ---- | ---- | ---- | ---- | ---- |
| 992 | ---- | ---- | ---- | ---- | ---- | X | X | X | X | X |
| 999 | ---- | ---- | ---- | ---- | ---- | X | X | ---- | ---- | ---- |
| 000 | ---- | ---- | ---- | ---- | ---- | ---- | ---- | ---- | ---- | ---- |

In the above table, the letter X shows when the indicated relay is operated. This table also shows that the FIG. 6 embodiment decimal-to-binary translation for decimal numbers from 001 to 511 is the same as that described for the FIG. 5 embodiment.

It will be observed that relay 211 is operated for all decimal numbers 001 to 511 to include resistor R1' in the series arm SEA. Contacts 4 of relay 811 complete a shunting path SEA' of series arm SEA, which extends through front contact 4 of relay 811 to the tap point of resistor R1'. This shunts the 23-unit left-hand portion of resistor R1' out of the series arm to reduce the total of 1023 units for resistors R1' to R10' to 1000 units. Thus the embodiment of FIG. 6 arrives at the desired decimal ratio of output to input potentials for numbers 001 to 511.

When operated, for all decimal numbers 001 to 511, relay 211 opens its back contact 4 to disable contacts 4 of relays 212 to 215 and 217. This limits the resistor shunting to 23 units.

The first departure of the FIG. 6 operation, with respect to the FIG. 5 operation, occurs at the decimal number 512. For the decimal number 512, the untapped resistor control relays 216, 218, 219, and 220 are restored. The above FIG. 6 table shows that for the first time (decimal number 512), relay 211 is restored. Relays 212–220 are operated. For this decimal number, the 512 resistance units of resistor R1′ are included in the shunt arm SHA through back contacts 1 and 3 of the unoperated relay 211, ground 221 through contacts 3 of the operated relays 212 to 220. The total combined resistance of resistors R2′ to R9′ is included in the series arm SEA through back contacts 2 of relay 211 and front contacts 1 and 2 of relays 212 to 220. With relay 211 restored and relay 212 operated, the 23-unit left-hand section of resistor R2′ is shunted out of the series arm SEA, over alternate path SEA′, through back contact 4 of relay 211, and front contact 4 of relay 212. This reduces the shunt-arm resistance by 23 units for a total effective potentiometer resistance of the desired 1000 decimally related units.

As shown by the FIG. 6 relay table, the second relay (812) is operated for all decimal numbers from 512 to 767 to give the same effect.

For all decimal numbers from 768 to 895 the first and second relays 211, 212 are restored, and the third relay 213 is operated. Here the shunt path SEA′ is extended through back contact 4 of relays 211 and 212 and through front contact 4 of relay 213 to shunt the 23-unit section of resistor R3′ out of the series arm SEA.

As shown by the above table, the first to third relays 211–213 of FIG. 6 are restored, and the fourth relay 214 is operated for decimal numbers 896 to 959. For any of these numbers, the shunt path SEA′ is extended through back contact 4 of relays 211 to 213 and front contact 4 of relay 214 to the tap point of resistor R4′, thereby shunting the 23-unit section of R4′ from the series arm SEA.

The table shows that decimal numbers 960 to 991 cause the first four relays 211–214 to be restored and the fifth 215 relay to be operated. Under this condition, the shunting conductor SEA′ is extended through back contact 4 of relays 211–214, and thence through front contact 4 of relay 215 to the tap point of resistor R5′, thereby shunting the 23-unit section thereof from the series arm SEA.

The above table shows that decimal numbers 992 to 999 cause the first five relays 211–215 to be restored and the sixth and seventh relays 216, 217 to be operated. Under this condition, conductor SEA′ is extended through back contact 4 of relays 211–215 and thence through front contact 4 of relay 217 to the tap point of resistor R8′. This shunts from the series arm SEA the 16-unit resistor R6′ and the left-hand 7-unit portion of resistor R7′, to remove 23 resistance units from the series arm and make the total effective potentiometer resistance 1000 units for this group of numbers.

Next assume that the decimal number is 000, indicating a 1:1 ratio of output potential to input potential. The translator departs from the translational arrangement used for the numbers 001 to 999 to the extent necessary to restore all of the ten potentiometer adjusting relays 211–220. Series arm SEA of FIG. 6 is now extended through back contacts 2 of relays 211–220 to output conductor 51A′. At the same time, the resistors R1′ to R10′ are all included in the shunt arm between conductor 51A and ground 224 through back contacts 1 and 3 of each of the relays 211 to 220. At this time, no attempt is made to shunt out any portion of any of the resistors, thus permitting the total shunt-arm resistance for the unit decimal number 000 to equal 1023 units. The additional 23 resistance units in the shunt arm has no disturbing effect on the ratio of output potential to input potential, since the ratio remains 1:1.

Moreover the resistances 1R, 2R, 4R etc. may be given any convenient values according to the desired incremental adjustment steps. Thus, if the smallest desired potentiometer adjustment is 100 ohms, that is the value of 1R. If it is 25 ohms, that is the value of 1R. However, regardless of the value selected, care should be exercised to preserve the same ratio of resistances in the two arms of the tapped resistors.

While we have described above the principles of our invention in connection with specific apparatus, it is to be clearly understood that this description is made only by way of example and not as a limitation to the scope of our invention.

We claim:

1. A potentiometer comprising a series of switching devices each having a series and a shunt position and including means for causing it to assume such positions alternatively, each switching device having first and second contact pairs each of which is open or is closed according to the position assumed by the device, a unitary series of impedance elements, each having a different impedance value, an input terminal, an output terminal, a reference terminal, a series arm comprising a closed connection from the input terminal to the output terminal by way of a separate impedance element connecting to a first contact pair for each switching device in series position and by way of impedance bypassing connections between a second contact pair for each switching device in shunt position, and a shunt arm comprising a closed connection from the output terminal to the reference terminal by way of a separate impedance element connecting to a second pair for each switching device in shunt position and by way of impedance-bypassing connections between a second contact pair for each switching device in series position, the said switching devices being respective two-position relays, a gate relay for connecting the potentiometer to the input terminal, means for operating and for restoring the gate relay, control conductors including conductors for the respective two-position relays, and means controlled over the control conductors subject to the gate relay being operated for operating any desired ones of the two-position relays and for restoring the remainder thereof.

2. A potentiometer comprising a series of switching devices each having a series and a shunt position and including means for causing it to assume such positions alternatively, each switching device having first and second contact pairs each of which is open or is closed according to the position assumed by the device, a unitary series of impedance elements each having a different impedance value, an input terminal, an output terminal, a reference terminal, a series arm comprising a closed connection from the input terminal to the output terminal by way of a separate impedance element connecting to a first contact pair for each switching device in series position and by way of impedance-bypassing connection between a second contact pair for each switching device in shunt position, and a shunt arm comprising a closed connection from the output terminal to the reference terminal by way of a separate impedance element connecting to a second contact pair for each switching device in shunt position and by way of impedance-bypassing connections between a first contact pair for each switching device in series position, the said impedance elements which can be inserted in either said arm comprising a series of elements, with the first element having one unit of impedance, with each element following the first and preceding the last, having twice as many units of impedance as its immediately preceding element, and with the final element of the series having that number of impedance units which must be added to the sum of the impedance units of all preceding impedance elements to equal the next higher decimal number represented by ten raised to a whole number power, thereby permitting the units of impedance includable in either said arm on respective combination settings of the switching devices to vary in one-unit steps between one unit and the said decimal number.

3. An automatic potentiometer having two arms separated by a common point, said potentiometer comprising a single unitary series of impedance elements, each of said elements having a different impedance value corresponding to the values of a series of binary increments, switching means associated with said series for selectively inserting each of said elements in either of said two arms, and means responsive to said selective insertion of said elements in one of said two arms for correcting the sum of said binary increments to correspond to a desired decimal value.

4. The potentiometer of claim 3 wherein each of said elements has two end terminals and each of a plurality of said elements includes a tapped connection between said two end terminals, the portions of said elements between said end terminals corresponding to said binary increments, and the portions of said plurality of elements between said tapped connections and an associated one of said end terminals corresponding to a correcting value, and said correcting means comprises means for operating said switching means to switch any of said correcting values from one to the other of said arms depending upon the side of said potentiometer where said correction is required.

References Cited by the Examiner

UNITED STATES PATENTS

| | | | |
|---|---|---|---|
| 2,799,821 | 7/1957 | Hannig et al. | 323—79 |
| 2,892,147 | 6/1959 | Bell | 323—79 |
| 2,999,202 | 9/1961 | Ule | 323—79 |
| 3,023,406 | 2/1962 | Jones | 340—347 |
| 3,056,956 | 10/1962 | Retzinger | 340—347 |
| 3,114,102 | 12/1963 | Yetter | 323—79 |

LLOYD McCOLLUM, *Primary Examiner.*

MALCOLM A. MORRISON, *Examiner.*

L. W. MASSEY, A. D. PELLINEN, *Assistant Examiners.*